United States Patent
Subramanian et al.

(10) Patent No.: US 11,748,208 B2
(45) Date of Patent: *Sep. 5, 2023

(54) PERSISTENT MEMORY ARCHITECTURE

(71) Applicant: NetApp Inc., San Jose, CA (US)

(72) Inventors: Ananthan Subramanian, San Ramon, CA (US); Ram Kesavan, Los Altos, CA (US); Matthew Fontaine Curtis-Maury, Apex, NC (US); Mark Smith, Cupertino, CA (US)

(73) Assignee: NetApp, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/576,981

(22) Filed: Jan. 16, 2022

(65) Prior Publication Data
US 2022/0138052 A1    May 5, 2022

Related U.S. Application Data

(63) Continuation of application No. 16/852,593, filed on Apr. 20, 2020, now Pat. No. 11,226,869.

(51) Int. Cl.
*G06F 3/06* (2006.01)
*G06F 11/14* (2006.01)
*G06F 11/20* (2006.01)

(52) U.S. Cl.
CPC .......... *G06F 11/1464* (2013.01); *G06F 3/067* (2013.01); *G06F 3/0619* (2013.01); *G06F 3/0641* (2013.01); *G06F 3/0659* (2013.01); *G06F 11/1451* (2013.01); *G06F 11/1453* (2013.01); *G06F 11/1469* (2013.01); *G06F 11/2056* (2013.01); *G06F 2201/84* (2013.01)

(58) Field of Classification Search
CPC .. G06F 11/1464; G06F 3/0619; G06F 3/0641; G06F 3/0659; G06F 3/067; G06F 11/1451; G06F 11/1453; G06F 11/1469; G06F 11/2056; G06F 2201/84; G06F 3/0605; G06F 3/0643; G06F 3/0649; G06F 3/0661; G06F 3/0601
USPC .................................................. 711/162, 161
See application file for complete search history.

(56) References Cited

U.S. PATENT DOCUMENTS

| 10,454,751 | B1 | 10/2019 | Bent et al. |
| 2005/0193084 | A1 | 9/2005 | Todd et al. |
| 2009/0024813 | A1* | 1/2009 | Uysal ............... G06F 11/1469 |
| | | | 711/E12.103 |

(Continued)

OTHER PUBLICATIONS

International Search Report/Written Opinion cited in Application No. PCT/US2021/028070 dated Aug. 17, 2021, 11 pgs.

*Primary Examiner* — David Yi
*Assistant Examiner* — Zubair Ahmed
(74) *Attorney, Agent, or Firm* — COOPER LEGAL GROUP, LLC

(57) ABSTRACT

Techniques are provided for implementing a persistent memory storage tier to manage persistent memory of a node. The persistent memory is managed by the persistent memory storage tier at a higher level within a storage operating system storage stack than a level at which a storage file system of the node is managed. The persistent memory storage tier intercepts an operation targeting the storage file system. The persistent memory storage tier retargets the operation from targeting the storage file system to targeting the persistent memory. The operation is transmitted to the persistent memory.

20 Claims, 11 Drawing Sheets

(56) References Cited

U.S. PATENT DOCUMENTS

| | | | |
|---|---|---|---|
| 2012/0215970 A1* | 8/2012 | Shats | G06F 11/1446 |
| | | | 711/E12.008 |
| 2017/0177447 A1* | 6/2017 | Golander | G06F 11/1471 |
| 2018/0232395 A1 | 8/2018 | Bent et al. | |
| 2019/0340083 A1* | 11/2019 | Ou-Yang | G06F 11/1469 |

* cited by examiner

PERSISTENT MEMORY ARCHITECTURE

RELATED APPLICATIONS

This application claims priority to and is a continuation of U.S. application Ser. No. 16/852,593, filed on Apr. 20, 2020, now allowed, titled "PERSISTENT MEMORY ARCHITECTURE," which is incorporated herein by reference.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage. Unfortunately, the storage file system may be unable to adequately utilize these faster types of storage for storing and providing access to client data because the storage file system cannot leverage the relatively faster access characteristics of such storage.

DETAILED DESCRIPTION

Figure 1:
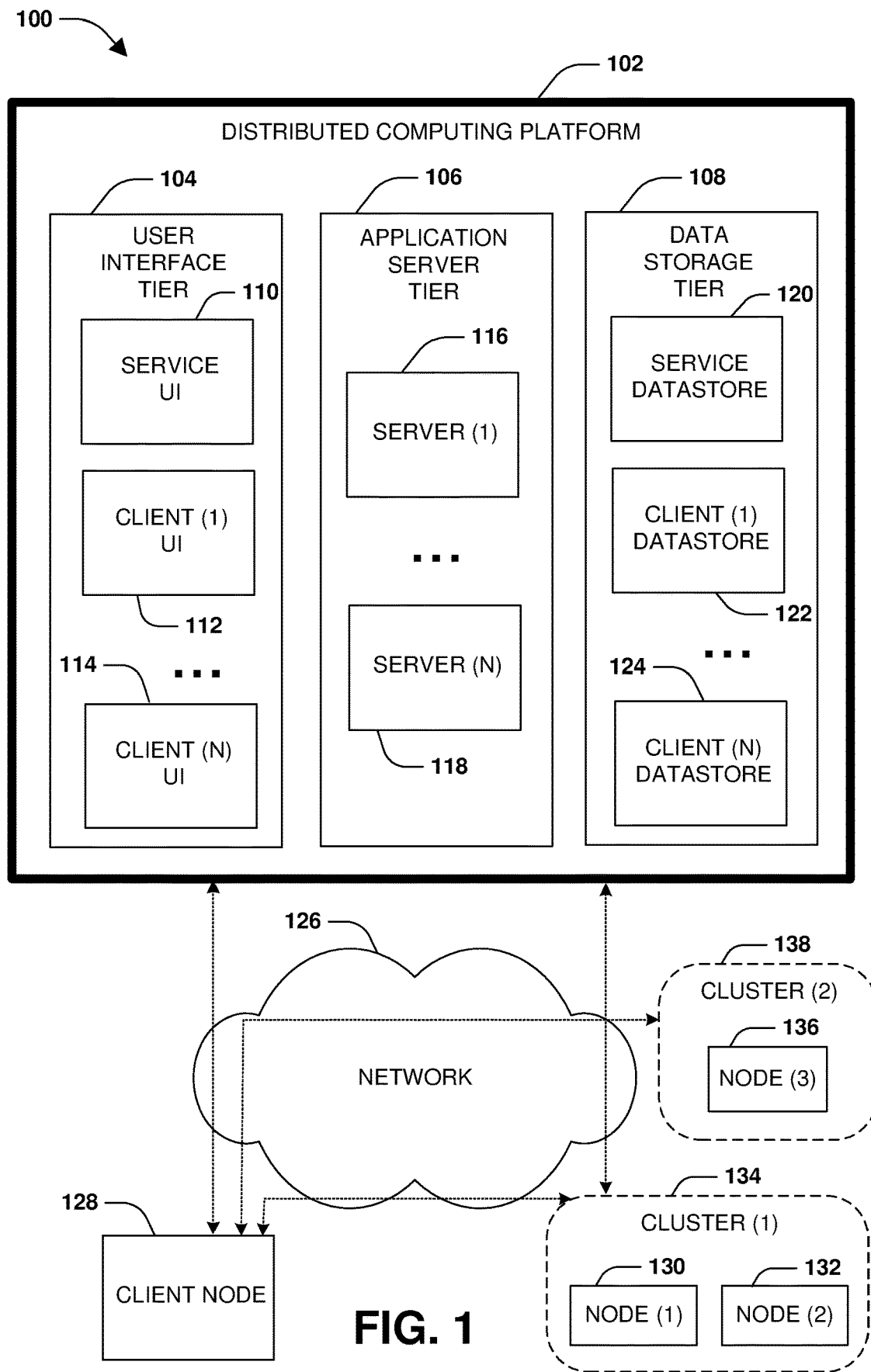
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A node may be implemented as a computing device, a server, an on-premise device, a virtual machine, hardware, software, or combination thereof. The node may be configured to manage storage on behalf of client devices using a storage environment, such as hard drives, solid state drives, cloud storage, or other types of storage within which client data may be stored through volumes, aggregates, cloud storage objects, etc. The node may manage this storage utilizing a storage operating system that can provide data protection and storage efficiency for the client data. For example, the storage operation system may implement and/or interact with storage services that can provide snapshot functionality, data migration functionality, compression, deduplication, encryption, backup and restore, cloning, synchronous and/or asynchronous replication, data mirroring, and/or other functionality for efficiently storing, protecting, and managing client data. The node may implement a storage file system through the storage operating system for organizing and managing the client data. In this way, a client device can connect to the node in order to access the client data through the storage file system.

As new types of storage media become available, it may be advantageous to leverage such storage media for use by the node for storing client data. However, the storage file system may not be tailored to leverage certain types of storage media because the storage file system may have been created and tailored to manage the storage of client data within relatively slower storage media, such as within hard drives, solid state drives, disk drives, and cloud storage. Thus, the storage file system may be unable to utilize these faster types of storage media, such as persistent memory (pmem). Persistent memory provides relatively lower latency and faster access speeds than storage media such as disk drives, cloud storage, and solid state drives, that the storage file system is natively tailored to manage. For example, the storage file system may be accessed by client devices that issue a substantial amount of operations to access client data through the storage file system. The storage file system may queue the operations for subsequent execution when resources are available. The particular manner and slowness of how the storage file system processes operations, such as through queuing, is too slow for the faster persistent memory. Thus, the storage file system is unable to leverage the persistent memory for use by the node for managing the storage of client data.

Accordingly, as provided herein, an architecture is provided for integrating and leveraging persistent memory for use by the node for managing the storage of client data. This architecture enables the storage operating system of the node to integrate with the persistent memory so that the storage operating system can store and retrieve data from the persistent memory, along with providing storage functionality of various storage services associated with the storage operating system. For example, data migration, data backup and restore, data tiering, snapshots, replication, mirroring of data, compression, deduplication, encryption, and/or a variety of other storage functionality can be provided for the persistent memory.

Instead of the storage file system natively utilizing the persistent memory (e.g., because of the relatively faster access path of the persistent memory), this architecture manages the persistent memory using a persistent memory storage tier. The persistent memory storage tier is hosted at a higher level within a storage operating system storage stack of the storage operating system than a level at which a storage file system tier is hosted for managing the storage file system. In this way, when an operation from a client device is received by the node, the operation is processed by higher level tiers within the storage operating system storage stack before lower level tiers. Thus, the persistent memory storage tier will intercept the operation before the operation reaches the storage file system tier and storage file system because the persistent memory storage tier is at a higher level within the storage operating system storage stack than the storage file system tier.

Once the operation, targeting the storage file system (e.g., a write operation to a file maintained by the storage file system), is intercepted, the persistent memory storage tier can determine whether the operation should be retargeted for the persistent memory or whether the operation should continue being processed through the storage operating system storage stack for further processing by the storage file system tier (which may, in turn, route to the storage file system). If the operation is a write operation and there is adequate storage space within the persistent memory (e.g., adequate available storage space or enough cold data accessed below a threshold frequency that can be tiered out from the persistent memory to the storage file system to make enough available storage space), then a policy may be used to determine whether the write operation should be retargeted to the persistent memory or not. For example, the policy may specify that if the write operation targets a file that is typically written to randomly and thus will likely be overwritten again while data is still resident within the persistent memory, then the write operation is retargeted to the persistent memory. That is, the policy may be used to identify situations where it is likely that data of an operation will be accessed again (e.g., access within a threshold timespan, accessed above a threshold frequency, etc.), and thus would take more advantage of the faster access speeds of the persistent memory. Otherwise, the write operation is transmitted (e.g., released by the persistent memory storage tier) to the storage file system tier for further processing, such as routing to the storage file system for execution upon storage maintained by the storage file system.

If the operation is a read operation, then the persistent memory storage tier will direct the read operation to the persistent memory if data to be read by the read operation is resident within the persistent memory. For example, the persistent memory storage tier may maintain a data structure, a fingerprint database, or other indication of what data is stored within the persistent memory in order to determine whether the data to be read is resident within the persistent memory. Also, a file system of the persistent memory may be utilized to determine what data is resident within the persistent memory. Otherwise, if the data to be read by the read operation is not resident within the persistent memory, then the read operation is transmitted (e.g., released by the persistent memory storage tier) to the storage file system tier for further processing, such as routing to the storage file system for execution upon storage maintained by the storage file system.

If the operation is routed to the persistent memory by the persistent memory storage tier, then the operation can be processed very quickly because of the low latency of the persistent memory and because the operation does not need to be processed by the storage file system tier that could otherwise queue the operation or introduce other latency in processing the operation for execution upon relatively higher latency storage. In this way, this architecture allows for the integration of persistent memory into the node in a manner that allows management of the persistent memory by the persistent memory storage tier of the storage operation system. Thus, the storage operation system is capable of providing improved data protection, storage efficiency, and storage services for data stored within the persistent memory storage tier.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a one or more file systems to logically organize data within storage devices as one or more storage objects and provide a logical/virtual representation of how the storage objects are organized on the storage devices (e.g., a file system tailored for block-addressable storage, a file system tailored for byte-addressable storage such as persistent memory). A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
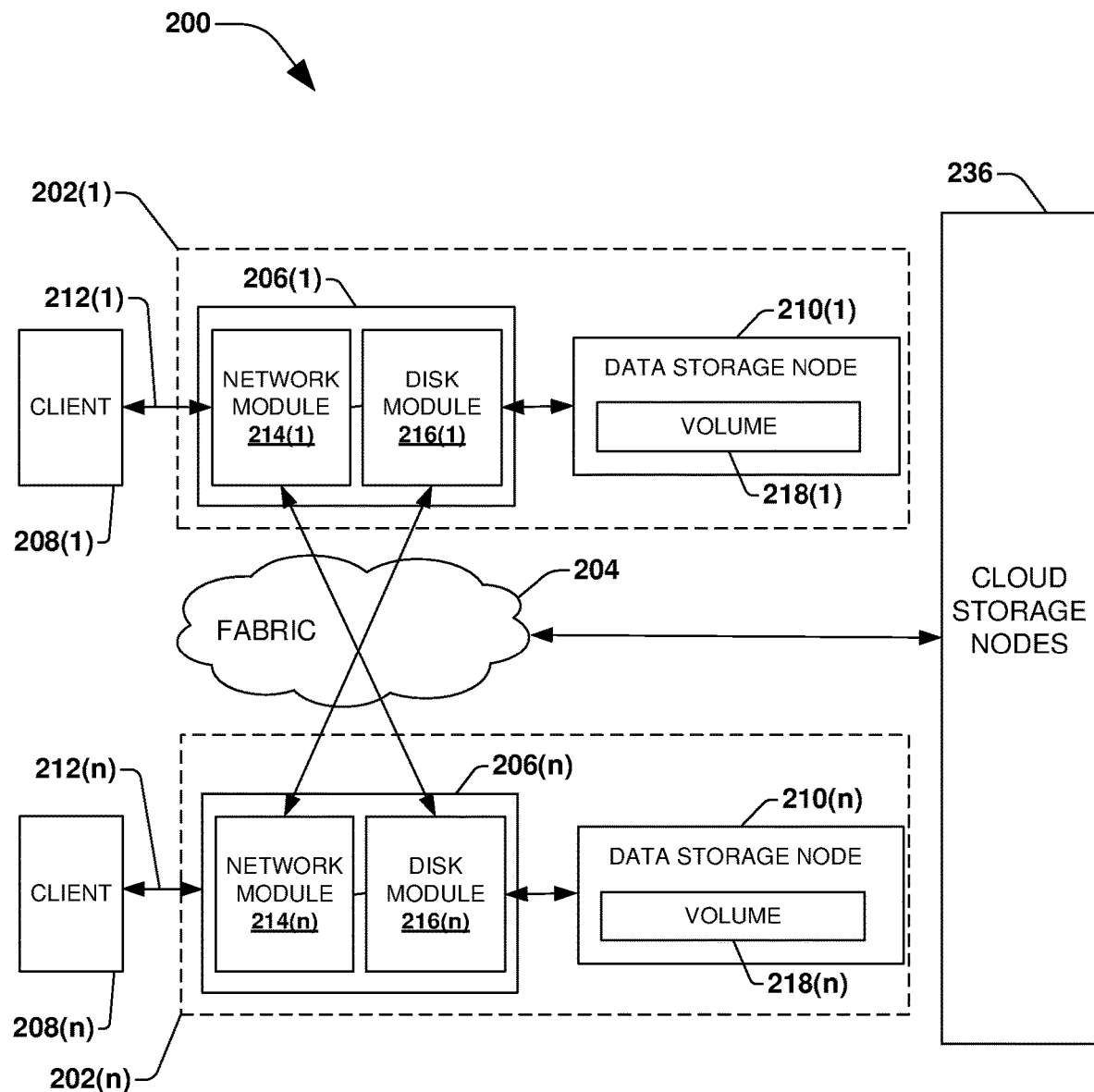
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
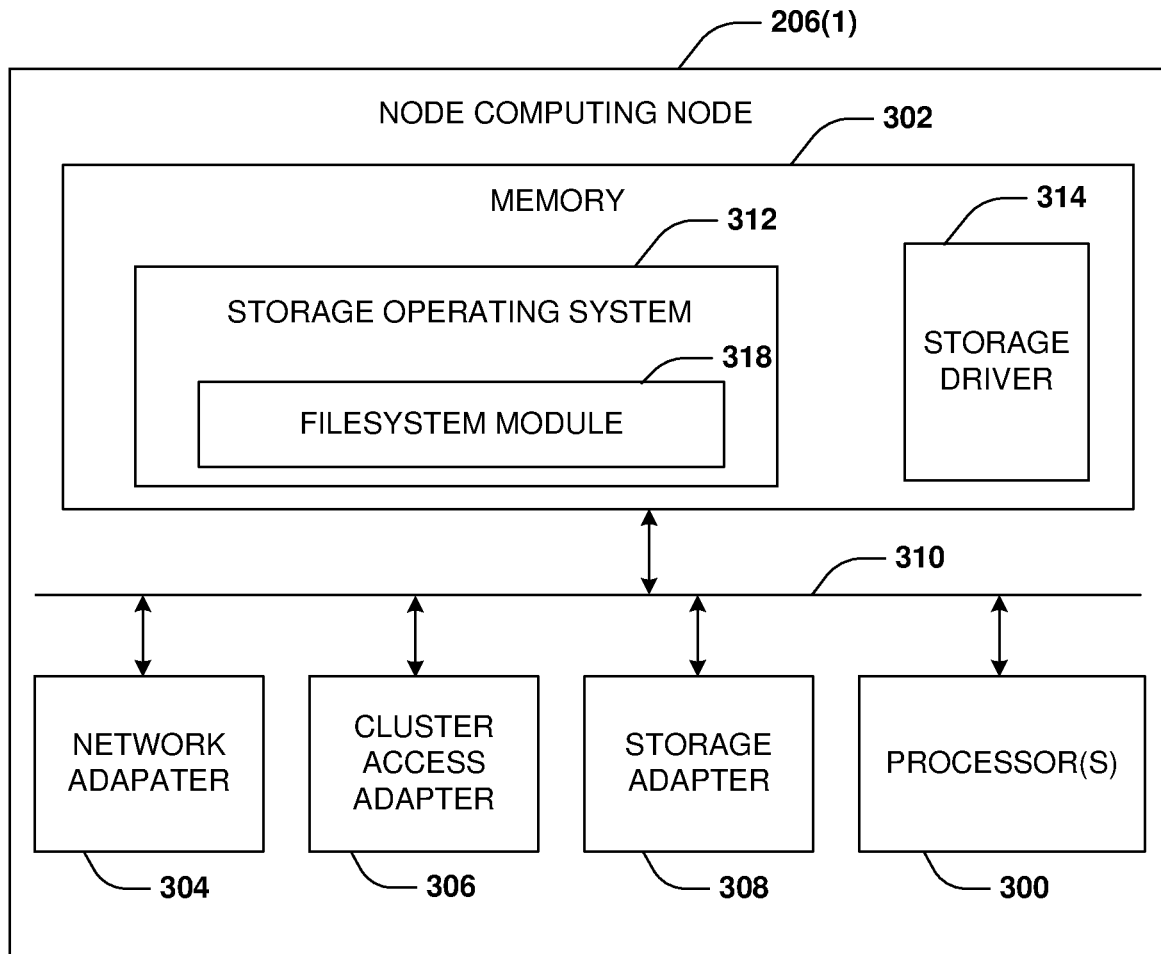
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1). In an example, a file system may be implemented for persistent memory.

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example implementing a persistent memory storage tier for managing persistent memory as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
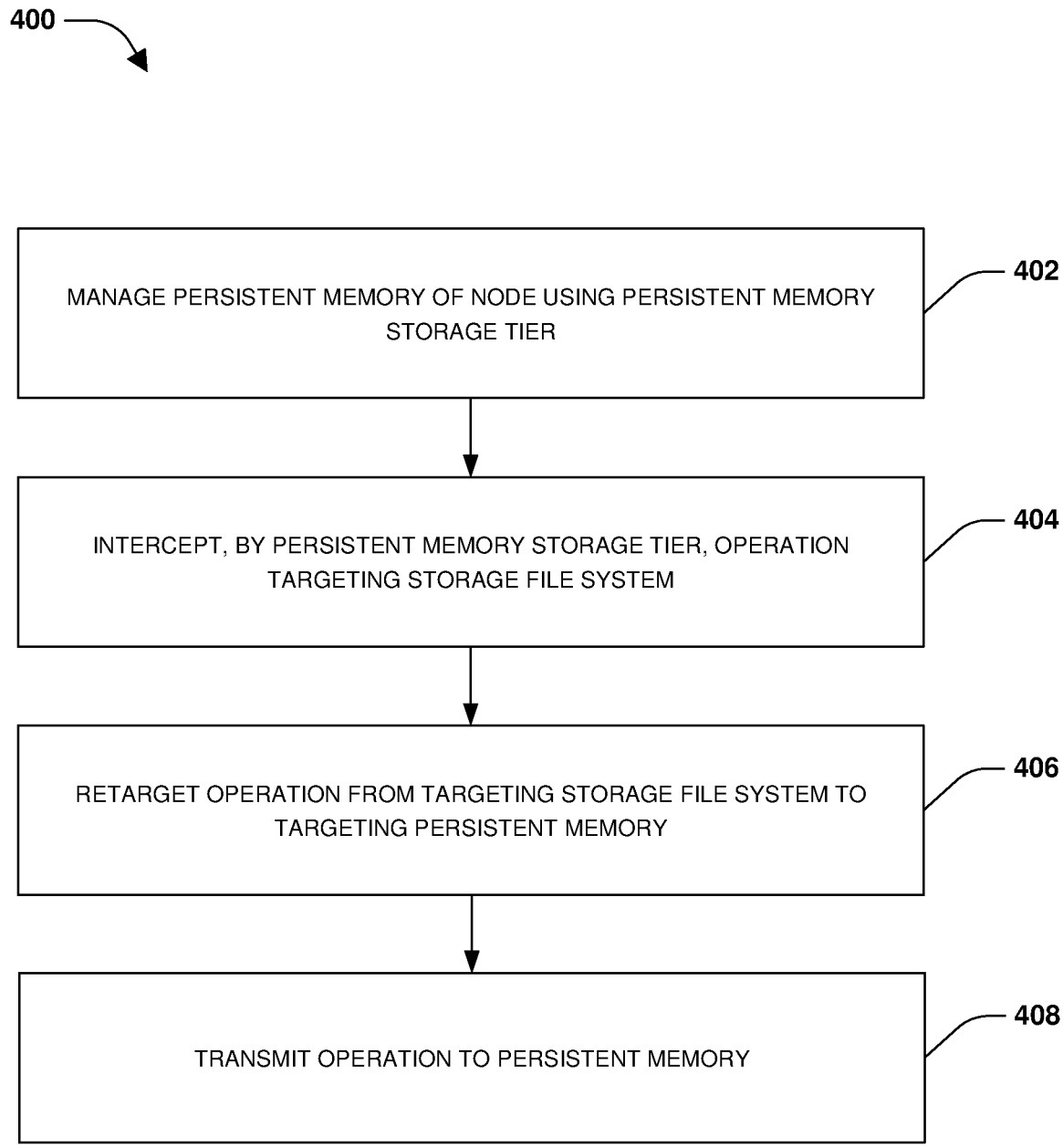
FIG. 4 is a flow chart illustrating an example method for implementing a persistent memory storage tier for managing persistent memory of a node.
Figure 5A:
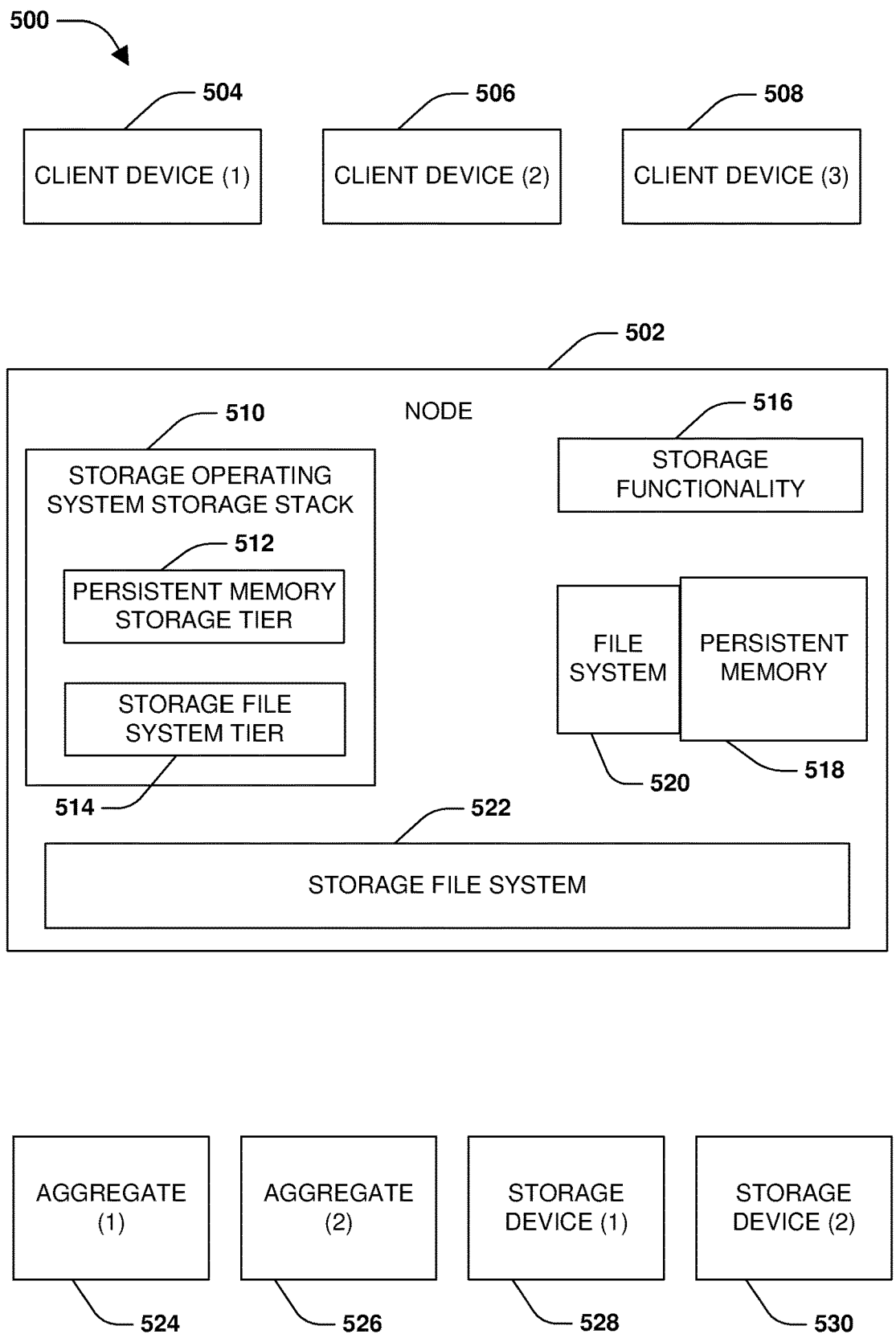
FIG. 5A is a block diagram illustrating an example system for implementing a persistent memory storage tier for managing persistent memory of a node.

One embodiment of implementing a persistent memory storage tier for managing persistent memory of a node is illustrated by an exemplary method 400 of FIG. 4, which is further described in conjunction with system 500 of FIGS. 5A-5E. A node 502 may comprise a server, an on-premise device, a virtual machine, computing resources of a cloud computing environment (e.g., a virtual machine hosted within the cloud), a computing device, hardware, software, or combination thereof. The node 502 may be configured to manage the storage and access of data on behalf of clients, such as a first client device 504, a second client device 506, a third client device 508, and/or other client devices, as illustrated by FIG. 5A. The node 502 may host a storage operating system configured to store and manage data within and/or across various types of storage devices, such as locally attached storage, cloud storage, disk storage, flash storage, solid state drives, tape, hard disk drives, etc. For example, the storage operating system of the node 502 may store data within a first storage device 528, a second storage device 530, and/or other storage devices. The data may be stored within storage objects, such as volumes, logical unit numbers (LUNs), aggregates, cloud storage objects, etc. For example, the storage operating system of the node 502 may store the data within a first aggregate 524, a second aggregate 526, and/or other storage objects. In an example, an aggregate or other storage object may be comprised of physical storage of a single storage device or storage of multiple storage devices or storage providers (e.g., the first aggregate 524 may be comprised of storage within the second storage device 530 and cloud storage).

The storage operating system of the node 502 may implement a storage file system 522 that manages the storage and client access of data within the storage objects stored within the storage associated with the node 502. For example, the first client device 504 may utilize the storage file system 522 in order to create, delete, organize, modify, and/or access files within directories of a volume managed by the storage file system 522. The storage operating system manages/comprises a storage operating system storage stack 510 that comprises a plurality of levels through which operations, such as read and write operations from client devices, are processed. An operation may first be processed by a highest level tier, and then down through lower level tiers of the storage operating system storage stack 510 until reaching a lowest level tier of the storage operating system storage stack 510. The storage file system 522 may be managed by a storage file system tier 514 within the storage operating system storage stack 510. When an operation reaches the storage file system tier 514, the operation may be processed by the storage file system 522, such as being queued for subsequent execution by the storage file system 522 when resources are available. The storage file system 522 may process the operation utilizing the storage associated with the node 502, such as the first storage device 528 (e.g., a hard disk drive) and the second storage device 530 (e.g., a solid state drive). Unfortunately, the storage file system 522 may be unable to natively leverage certain types of storage devices, such as persistent memory 518 or other types of relatively faster storage media.

Accordingly, as provided herein, an architecture is provided for the node 502 that enables the node 502 to utilize the persistent memory 518 (pmems) by using a persistent memory storage tier 512 within the storage operating system storage stack 510. The persistent memory 518 may comprise memory that is persistent, such that data structures can be stored in a manner where the data structures can continue to be accessed using memory instructions and/or memory APIs even after the end of a process that created or last modified the data structures. The data structures and data will persist even in the event of a power loss, failure and reboot, etc. The persistent memory 518 is non-volatile memory that has nearly the same speed and latency of DRAM and has the non-volatility of NAND flash. The persistent memory 518 could dramatically increase system performance of the node 502 compared to the higher latency and slower speeds of the storage accessible to the node 502 through the storage file system 522 using the storage file system tier 514 (e.g., hard disk drives, solid state storage, cloud storage, etc.). The persistent memory 518 is byte addressable, and may be accessed through a memory controller. This provides faster and more fine-grained access to persistent storage within the persistent memory 518 compared to block-based access to other types of storage devices such as disk drives through the storage file system 522.

A separate file system 520 may be implemented for the persistent memory 518. The file system 502 is different than the storage file system 522 implemented for the other storage accessible to the node 502, such as the first storage device 528, the second storage device 530, the first aggregate 524, the second aggregate 526, etc. In an example, the file system 520 may be tailored to how the persistent memory 518 is byte addressable compared to how the storage file system 522 is tailored for block based or logical access to the other storage accessible to the node 502. Also, the file system 520 may be tailored for the relatively faster access speeds and lower latency of the persistent memory 518.

In order to integrate the persistent memory 518 into the node 502 in a manner that allows client data of the first client device 504, the second client device 506, the third client device 508, and/or other client devices to be stored into and read from the persistent memory 518, the persistent memory storage tier 512 is implemented within the storage operating system storage stack 510 for managing the persistent memory 518, at 402 (of FIG. 4's exemplary method 400). The persistent memory storage tier 512 is maintained at a higher level within the storage operating system storage stack 510 than the storage file system tier 514 used to manage the storage file system 522. The persistent memory storage tier 512 is maintained higher in the storage operating system storage stack 510 than the storage file system tier 514 so that operations received from client devices by the node 502 are processed by the persistent memory storage tier 512 before the storage file system tier 514 even though the operations may target the storage file system 522 managed by the storage file system tier 514.

The persistent memory storage tier 512 may implement various APIs, functionality, data structures, etc. for accessing and/or managing the persistent memory 518. For example, the persistent memory storage tier 512 may implement APIs to access the file system 520 of the persistent memory 518 for storing data into and/or retrieving data from the persistent memory 518. The persistent memory storage tier 512 may implement functionality to determine when data should be tiered out from the persistent memory 518 to other storage such as the first storage device 528 based upon the data becoming infrequently accessed, and thus cold (e.g., the functionality may track how often and how recent data within the persistent memory 518 has been accessed).

The persistent memory storage tier 512 may implement functionality to utilize a policy to determine whether certain operations should be redirected to the persistent memory 518 or not (e.g., if an operation targets a file that the policy predicts will be accessed again, such as accessed within a threshold timespan or accessed with above a certain frequency, then the operation will be retargeted to the persistent memory 518). In an example, the persistent memory storage tier 512 may implement a data structure, such as a fingerprint database, used to determine what data is stored within the persistent memory 518 so that read operations to read particular data can be retargeted to the persistent memory 518 if the data is stored within the persistent memory 518. In another example, the persistent memory storage tier 512 may utilize the file system 520 to determine what data is already stored within the persistent memory 518.

The node 502 may receive an operation from a client device. The operation may be processed by the storage operating system using the storage operating system storage stack 510 from a highest level down through lower levels of the storage operating system storage stack 510. Because the persistent memory storage tier 512 is at a higher level within the storage operating system storage stack 510 than the storage file system tier 514, the operation is intercepted by the persistent memory storage tier 512 before reaching the storage file system tier 514. The operation is intercepted by the persistent memory storage tier 512 before reaching the storage file system tier 514 even though the operation may target the storage file system 522 managed by the storage file system tier 514. This is because the persistent memory storage tier 512 is higher in the storage operating system storage stack 510 than the storage file system tier 514. In this way, the operation is intercepted by the persistent memory storage tier 512 within the storage operating system storage stack 510, at 404.

The persistent memory storage tier 512 may determine whether the operation is to be retargeted to the persistent memory 518 or whether the operation is to be transmitted (e.g., released to lower tiers within the storage operating system storage stack 510) by the persistent memory storage tier 512 to the storage file system tier 514 for processing by the storage file system 522 utilizing the other storage associated with the storage file system 522. In an embodiment, the operation comprises a read operation by a client device to read data stored by the node 502 on behalf of the client device. The persistent memory storage tier 512 determines whether the read operation should be retargeted to the persistent memory 518 or whether the read operation is to be released to a next lower tier within the storage operating system storage stack 510 for further processing.

If the read operation targets data within the persistent memory 518 (e.g., a lookup of a data structure used to track what data is stored in the persistent memory 518 may indicate that the data to be read is stored within the persistent memory 518; the file system 520 may provide an indication that the data to be read is stored within the persistent memory 518; etc.), then the read operation is retargeted from targeting the storage file system 522 to targeting the persistent memory 518, at 406. In an example, the read operation may be modified to target a byte address of a location within the persistent memory 518 at which the data to be read is located. At 408, the read operation is transmitted to the persistent memory 518, such as through the file system 520, to read the data from the persistent memory 518. In this way, the data is returned by the node 502 to the client device in a response to the read operation. If the read operation is to read data not currently stored within the persistent memory 518, then the read operation is transmitted from the persistent memory storage tier 512 to a next lower tier within the storage operating system storage stack 510 such as to the storage file system tier 514 for further processing by the storage file system 522. In an example where the data to be read by the read operation is not located within the persistent memory 518, then the data is read from the storage file system 522. A policy is utilized by the persistent memory storage tier 512 to determine (e.g., based upon a workload of what data is being accessed, how frequently the data is being accessed, and/or other access patterns and other characteristics of the workload that includes the read operation) whether the data should be stored into the persistent memory 518 after the read operation has been processed by the storage file system 522 so that the data will be present within the persistent memory 518 for processing subsequent operations to the data.

In an embodiment, the operation comprises a write operation. The persistent memory storage tier 512 may utilize a policy to determine whether the write operation should be retargeted to the persistent memory 518 or should be transmitted (e.g., released or passed along) from the persistent memory storage tier 512 to a next lower tier within the storage operating system storage stack 510 such as to the storage file system tier 514 for further processing by the storage file system 522. The policy may specify that data being accessed a certain way (e.g., sequentially read data, sequentially written data, randomly written data, non-sequentially read data, etc.), data of a storage object such as a file being accessed at a certain frequency or recency, and/or data having other certain characteristics should either be written to the persistent memory 518 or written to the other storage associated with the storage file system 522. For example, the policy may specify that if the operation is to write data to a file that is typically written to randomly and thus may be likely to be overwritten again while the data is still resident in the persistent memory 518, then the operation should be retargeted to the persistent memory 518. In this way, the persistent memory storage tier 512 utilizes the persistent memory 518 for processing certain operations identified by the policy.

In an embodiment, the persistent memory storage tier 512 is capable of intercepting operations that target different aggregates because the persistent memory storage tier 512 is at the higher level within the storage operating system storage stack 510 than the storage file system tier 514, and thus can absorb any I/O from any client device directed to any aggregate and/or physical storage. For example, the persistent memory storage tier 512 can intercept a first operation targeting the first aggregate 524 to determine whether the first operation should be retargeted to the persistent memory 518 or should be transmitted (e.g., released or passed long) from the persistent memory storage tier 512 to the storage file system tier 514 for further processing by the storage file system 522 using the first aggregate 524. The persistent memory storage tier 512 can intercept a second operation targeting the second aggregate 526 to determine whether the second operation should be retargeted to the persistent memory 518 or should be transmitted (e.g., released or passed long) from the persistent memory storage tier 512 to the storage file system tier 514 for further processing by the storage file system 522 using the second aggregate 526.

In an embodiment, the persistent memory storage tier 512 is capable of intercepting operations that target different storage devices because the persistent memory storage tier 512 is at the higher level within the storage operating system storage stack 510 than the storage file system tier 514, and thus can absorb any I/O from any client device directed to any aggregate and/or physical storage. For example, the persistent memory storage tier 512 can intercept a first operation targeting the first storage device 528 (e.g., a hard disk drive) to determine whether the first operation should be retargeted to the persistent memory 518 or should be transmitted (e.g., released or passed long) from the persistent memory storage tier 512 to the storage file system tier 514 for further processing by the storage file system 522 using the first storage device 528. The persistent memory storage tier 512 can intercept a second operation targeting the second storage device 530 (e.g., cloud storage) to determine whether the second operation should be retargeted to the persistent memory 518 or should be transmitted (e.g., released or passed long) from the persistent memory storage tier 512 to the storage file system tier 514 for further processing by the storage file system 522 using the second storage device 530.

In an embodiment, the persistent memory storage tier 512 is capable of intercepting operations from any client device because the persistent memory storage tier 512 is at the higher level within the storage operating system storage stack 510 than the storage file system tier 514, and thus can absorb any I/O from any client device directed to any aggregate and/or physical storage. For example, the persistent memory storage tier 512 can intercept a first operation from the first client device 504 to determine whether the first operation should be retargeted to the persistent memory 518 or should be transmitted (e.g., released or passed long) from the persistent memory storage tier 512 to the storage file system tier 514 for further processing by the storage file system 522. The persistent memory storage tier 512 can intercept a second operation from the second client device 506 to determine whether the second operation should be retargeted to the persistent memory 518 or should be transmitted (e.g., released or passed long) from the persistent memory storage tier 512 to the storage file system tier 514 for further processing by the storage file system 522.

In an embodiment, storage functionality 516 provided by various storage services of the storage operating system of the node 502 may be provided for data within the persistent memory 518 using the persistent memory storage tier 512. In an example, snapshot functionality may be provided to create snapshots and restore data using snapshots. A snapshot may be created that includes at least some data within the persistent memory 518. The snapshot may comprise only data within the persistent memory 518, some data within the persistent memory 518 and some data located elsewhere such as within the other storage associated with the storage file system 522 (e.g., data within the first aggregate 524, data within the second aggregate 526, data within the first storage device 528, data within the second storage device 530, etc.), etc. The snapshot may be subsequently used to restore the data within the persistent memory 518 to a state of the data captured by the snapshot.

In an embodiment, the data within the persistent memory 518 may be compressed utilizing compression functionality of the node 502. In an embodiment, the data within the persistent memory 518 may be deduplicated utilizing deduplication functionality of the node 502 in order to remove duplicate data within the persistent memory 518 by replacing duplicate data with references to a single instance of the data. The deduplication functionality may provide inline deduplication where data being written by write operations is deduplicated with respect to data stored within the persistent memory 518 so that duplicate data within the data being written is not redundantly stored within the persistent memory 518. Instead, a reference to the currently stored data within the persistent memory 518 is stored. The deduplication functionality may provide background deduplication of data already stored within the persistent memory 518 in order to replace duplicate instances of data with references to a single instance of the data.

In an embodiment, clone functionality is provided for data within the persistent memory 518. The clone functionality may be implemented to capture writable snapshots of a single file, a LUN, etc. In this way, a clone of the file, LUN, etc. can be created. The clone functionality may be implemented to capture a writeable snapshot of a volume having at least some data stored within the persistent memory 518, which may be a space efficient copy of the volume such that the writeable snapshot references back to data of the volume instead of comprising a copy of the data. Once the writeable snapshot is modified, the modifications are stored within the writeable snapshot. In his way, a clone of the volume can be created. Data of the file, LUN, and/or volume may be entirely within the persistent memory 518 or some portions of the data may be stored within the persistent memory 518 while other portions of the data may be stored at other storage tiers, such as the first aggregate 524, the second aggregate 526, the first storage device 528, the second storage device 530, cloud storage, a disk drive, etc.

In an example, volume level data replication may be implemented for the persistent memory 518. The volume level data replication may replicate data from a primary source to a destination target. Data within the persistent memory 518 and/or other storage tiers (e.g., the first aggregate 524, the second aggregate 526, the first storage device 528, the second storage device 530, cloud storage, a disk drive, etc.) may be replicated from the primary source to the destination target. For example, the volume level data replication may replicate a volume (e.g., a FlexVol) even though some of the data may be maintained by the file system 520 of the persistent memory 518 and some of the data of the volume is maintained by the storage file system 522 of other storage.

In an embodiment, the persistent memory 518 may natively provide atomicity for a first atomicity size of data. In an example where the first atomicity size is 64 bits (e.g., the persistent memory 518 natively supports atomicity of 64 bits), an operation targeting a 64 bit range or less will either successfully write all data or will completely fail to write all data so that there is no partial success of writing only some of the data, which can lead to data corruption and operational errors. The persistent memory storage tier 512 may be capable of supporting a second atomicity size of data for the persistent memory 518 that is different, such as larger than, the first atomicity size natively supported by the persistent memory 518. The persistent memory storage tier 512 may support the different second atomicity size because certain storage protocols may guarantee a different atomicity size than the first atomicity size. For example, certain storage protocols may guarantee 4 kb, 64 kb, or any other size of atomicity. Thus, the persistent memory storage tier 512 may support the second atomicity size of 4 kb, 64 kb, etc. For example, the persistent memory storage tier 512 may ensure that a write operation of 4 kb will either succeed completely to write all data or completely fail to write any data, and that there will be no instance where merely some of the data is written to the persistent memory 518.

In an embodiment, the storage file system 522 may also utilize the persistent memory 518 as a primary data source (e.g., a third storage device within which the storage file system 522 can store client data) or as a secondary data source over the primary data source (e.g., a cache). The persistent memory 518 may thus be used as an external cache device by the storage file system 522, where hot or frequently accessed data may be stored by the storage file system 522 into the persistent memory 518, while other data is stored in relatively slow storage media such as disk drives, cloud storage, solid state drives, etc.

Figure 5B:
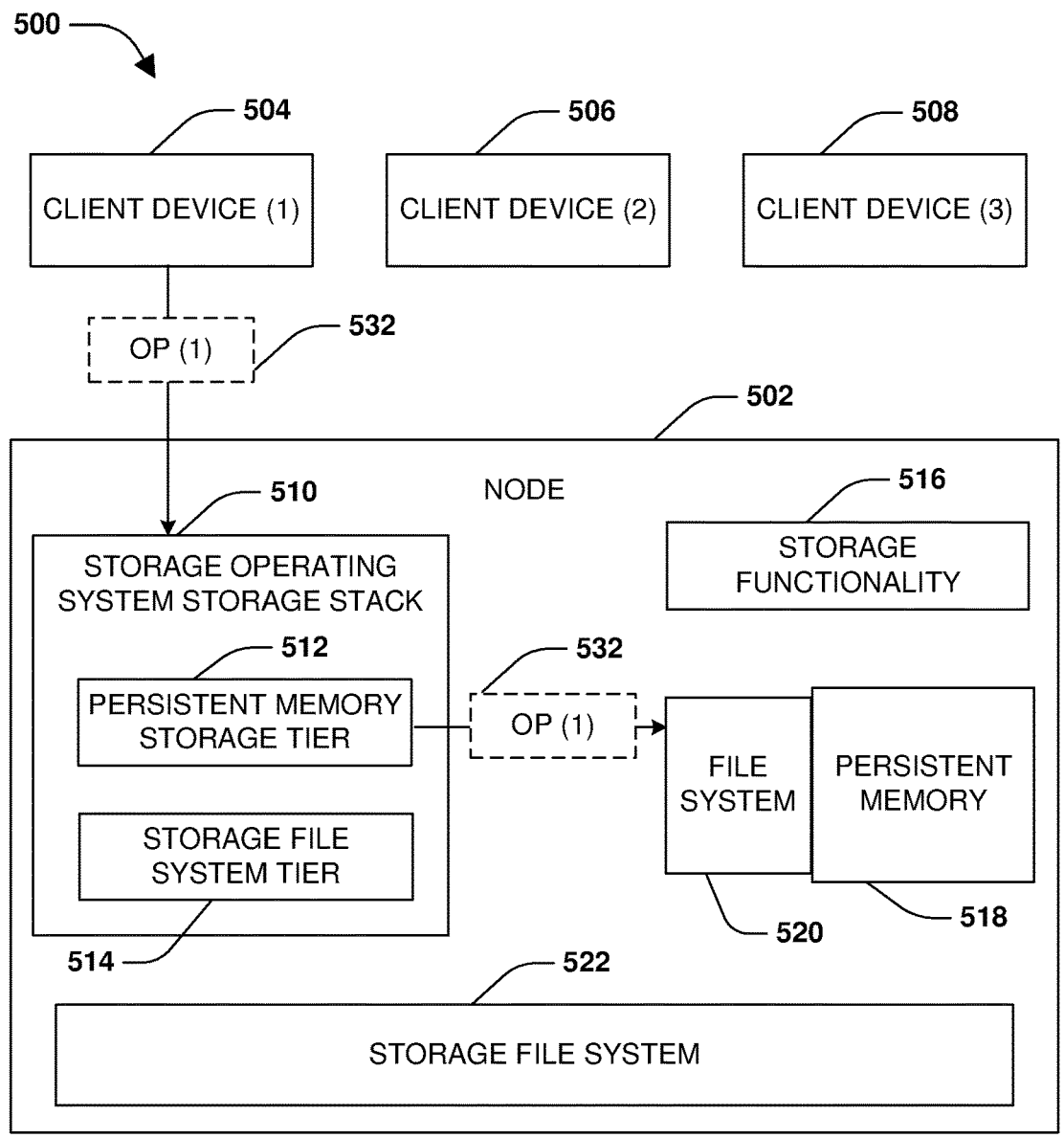
FIG. 5B is a block diagram illustrating an example system for implementing a persistent memory storage tier for managing persistent memory of a node, where a first operation is transmitted to the persistent memory.
Figure 5B:
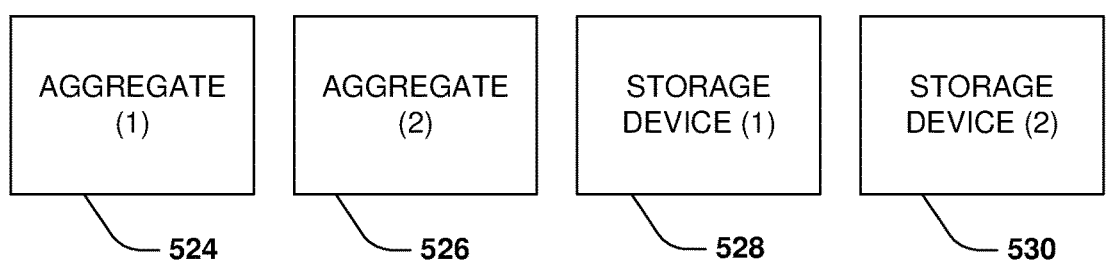

FIG. 5B illustrates an example of the node 502 processing a first operation 532, such as a read operation to read a file maintained by the node 502 on behalf of the first client device 504. The first client device 504, such as a first application server of the first client device 504, may connect to the node 502 over a network. The first client device 504 may transmit the first operation 532 over the network to the node 502. The storage operating system of the node 502 may utilize the storage operating system storage stack 510 to process the first operation 532. Because the persistent memory storage tier 512 is higher in the storage operating system storage stack 510 than the storage file system tier 514, the persistent memory storage tier 512 intercepts the first operation 532 before the first operation 532 can reach the storage file system tier 514 even though the first operation 532 may target the storage file system 522 managed by the storage file system tier 514.

The persistent memory storage tier 512 may determine that data of the file targeted by the first operation 532 is stored within the persistent memory 518 through the file system 520. Accordingly, the persistent memory storage tier 512 retargets the first operation 532 from targeting the storage file system 522 to targeting the persistent memory 518, such as to target the file system 520 of the persistent memory 518. The persistent memory storage tier 512 transmits the first operation 532 to the persistent memory 518 in order to read the data of the file, which is returned by the node 502 to the first client device 504.

Figure 5C:
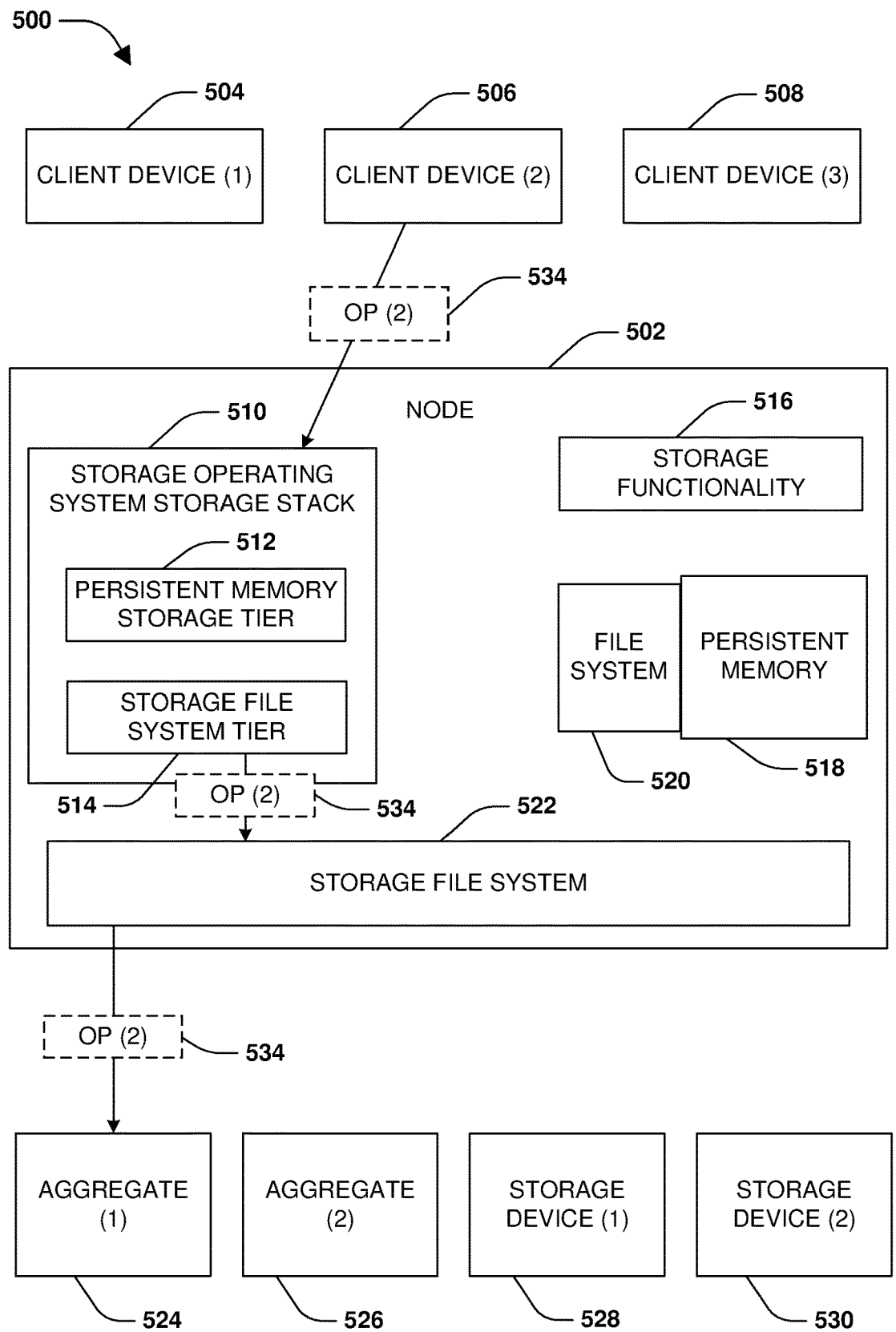
FIG. 5C is a block diagram illustrating an example system for implementing a persistent memory storage tier for managing persistent memory of a node, where a second operation is transmitted to a storage file system.

FIG. 5C illustrates an example of the node 502 processing a second operation 534, such as a write operation to write data to a file maintained by the node 502 on behalf of the second client device 506. The second client device 506, such as a second application server of the second client device 506, may connect to the node 502 over a network. The second client device 506 may transmit the second operation 534 over the network to the node 502. The storage operating system of the node 502 may utilize the storage operating system storage stack 510 to process the second operation 534. Because the persistent memory storage tier 512 is higher in the storage operating system storage stack 510 than the storage file system tier 514, the persistent memory storage tier 512 intercepts the second operation 534 before the second operation 534 can reach the storage file system tier 514 even though the second operation 534 may target the storage file system 522 managed by the storage file system tier 514.

The persistent memory storage tier 512 may evaluate the second operation 534 utilizing a policy to determine whether the second operation 534 is to be retargeted to the persistent memory 518. For example, the second operation 534 may target a file that is infrequently written to and accessed. The policy may specify that write operations targeting infrequently written to and/or infrequently accessed storage objects should not be retargeted to the persistent memory 518. Based upon the policy, the persistent memory storage tier 512 transmits the second operation 534 to the next lower tier within the storage operating system storage stack 510 such as to the storage file system tier 514. The storage file system tier 514 may process the second operation 534 using the storage file system 522 to write the data into the first aggregate 524.

Figure 5D:
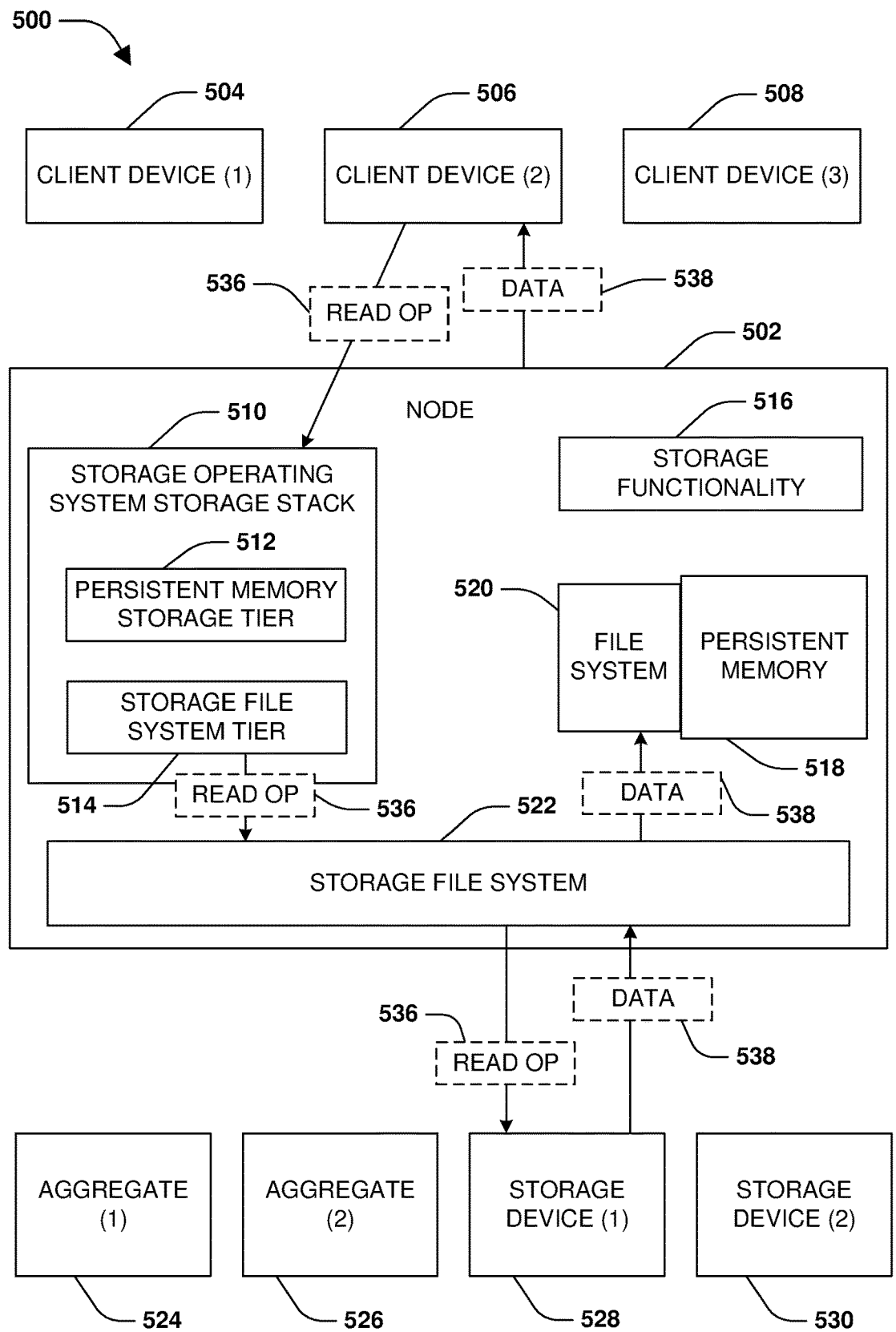
FIG. 5D is a block diagram illustrating an example system for implementing a persistent memory storage tier for managing persistent memory of a node, where data obtained by a storage file system is stored within the persistent memory.

FIG. 5D illustrates an example of the node 502 processing a read operation 536 to read data 538 from the first storage device 528 that is then tiered up to the persistent memory 518. In an embodiment, the persistent memory 518 is utilized to store frequently accessed (hot) data that is accessed above a threshold frequency or recency. When data is read through the storage file system 522 from other storage, such as disk storage, solid state drives, cloud storage, etc., the data may be selectively stored into the persistent memory 518 based upon a policy. For example, the policy may specify recency thresholds of how recently data is to be accessed before being tiered up into the persistent memory 518, access patterns of data to be tiered up into the persistent memory 518 (e.g., random access, sequential access, etc.), frequency thresholds of how frequently data is to be accessed before being tiered up into the persistent memory 518, etc.

The second client device 506 may transmit the read operation 536 over the network to the node 502. The storage operating system of the node 502 may utilize the storage operating system storage stack 510 to process the read operation 536. Because the persistent memory storage tier 512 is higher in the storage operating system storage stack 510 than the storage file system tier 514, the persistent memory storage tier 512 intercepts the read operation 536 before the read operation 536 can reach the storage file system tier 514 even though the read operation 536 may target the storage file system 522 managed by the storage file system tier 514.

The persistent memory storage tier 512 may determine that the read operation 536 is to read data 538 not stored within the persistent memory 518, and that the data 538 should be subsequently tiered into the persistent memory 518 based upon a policy. Accordingly, the persistent memory storage tier 512 transmits the read operation 536 to the storage file system tier 514. The storage file system tier 514 may process the read operation 536 using the storage file system 522 to read the data 538 from the file within the first storage device 528. An indication may be provided from the persistent memory storage tier 512 to the storage file system 522 that the data 538 is to be removed from the first storage device 528 and tiered into the persistent memory 518. Accordingly, the data 538 is removed from the first storage device 528 and tiered into the persistent memory 518. The data 538 is also returned to the second client device 506 in response to the read operation 536. The persistent memory storage tier 512 and/or the file system 520 may create an indication that the data 538 is now stored within the persistent memory 518.

Figure 5E:
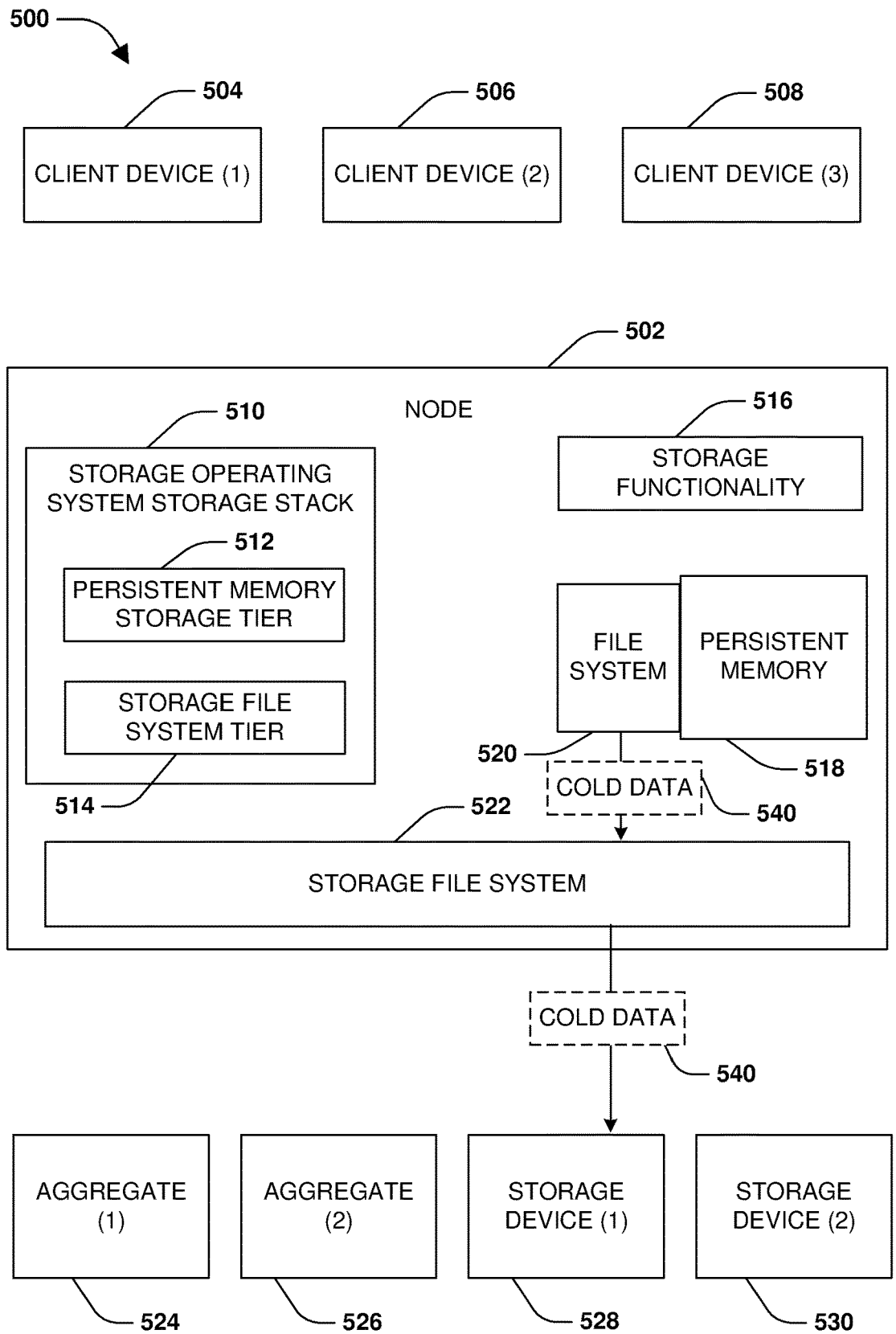
FIG. 5E is a block diagram illustrating an example system for implementing a persistent memory storage tier for managing persistent memory of a node, where cold data is tiered out from the persistent memory to a storage file system.

FIG. 5E illustrates the persistent memory storage tier 512 tiering out cold data 540 from the persistent memory 518. The persistent memory storage tier 512 may track the frequency at which data within the persistent memory 518 is being accessed and/or how recently data has been accessed. If certain data is being accessed below a threshold frequency or has not been accessed for a threshold timespan, then the persistent memory storage tier 512 may deem the data as being cold data 540. The persistent memory storage tier 512 may utilize the file system 520 and/or the storage file system 522 to tier out (remove) the cold data 540 from the persistent memory 518 and store the cold data 540 into other storage such as the first storage device 528. The persistent memory storage tier 512 and/or the file system 520 may remove any indication that the cold data 540 resides within the persistent memory 518.

Figure 6:
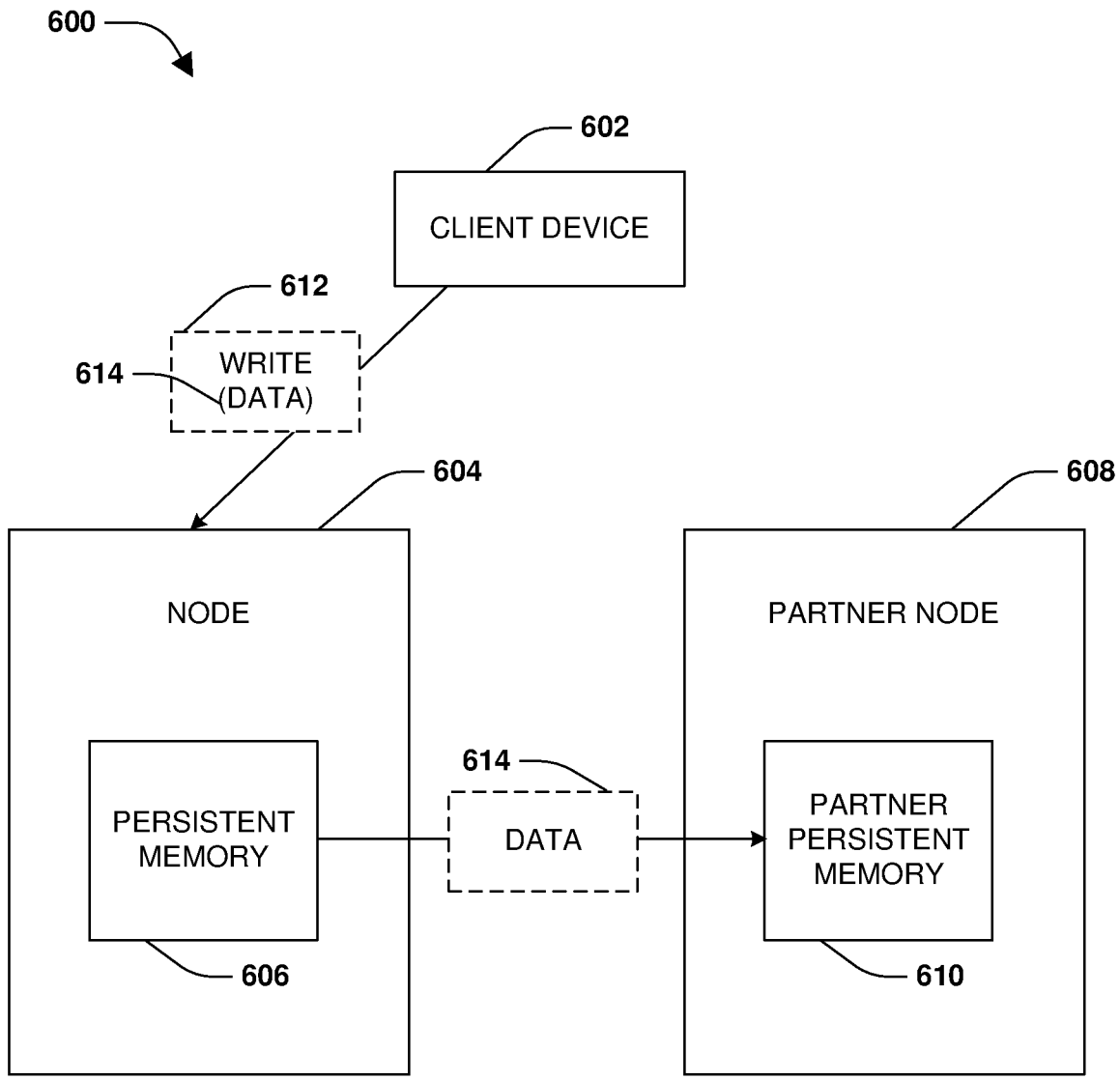
FIG. 6 is a block diagram illustrating an example system for implementing a persistent memory storage tier for managing persistent memory of a node, where data of the persistent memory is mirrored to partner persistent memory of a partner node.

FIG. 6 illustrates an example of a system 600 for mirroring data between a high availability pairing of nodes. The high availability pairing of nodes may comprise a node 604 and a partner node 608. The node 604 may selectively store certain data within persistent memory 606 of the node 604 utilizing a persistent memory storage tier of a storage operating system storage stack, while storing other data through a storage file system within other storage such as disk drives, solid state storage, cloud storage etc. The partner node 608 may maintain a partner persistent memory 610. The partner node 608 may selectively store certain data within partner persistent memory 610 utilizing a persistent memory storage tier of a storage operating system storage stack, while storing other data through a storage file system within other storage such as disk drives, solid state storage, cloud storage etc.

The node 604 and the partner node 608 are partners such that if one node fails then the surviving node can take over the processing of subsequent operations in place of the failed node. In order to ensure that the node 604 and the partner node 608 have the most up-to-date data in the event of a takeover, data stored within the persistent memory 606 by the node 604 is mirrored to the partner persistent memory 610 of the partner node 608 and data stored by the partner persistent memory 610 by the partner node 608 is mirrored to the persistent memory of the node 604. Thus, if a node fails, then the surviving node will have access to up-to-date mirrored data of the failed node within its own persistent memory. In an example of mirroring data, the node 604 may receive a write operation 612 from a client device 602 to write data 614. The persistent memory storage tier of the node 604 may determine that the data 614 is to be written to the persistent memory 606 of the node 604. As part of writing the data 614 to the persistent memory 606, the data 614 is also mirrored to the partner persistent memory 610. Once the data 614 is written to both the persistent memory 606 and the partner persistent memory 610, the write operation 612 is acknowledged as successful.

Figure 7:
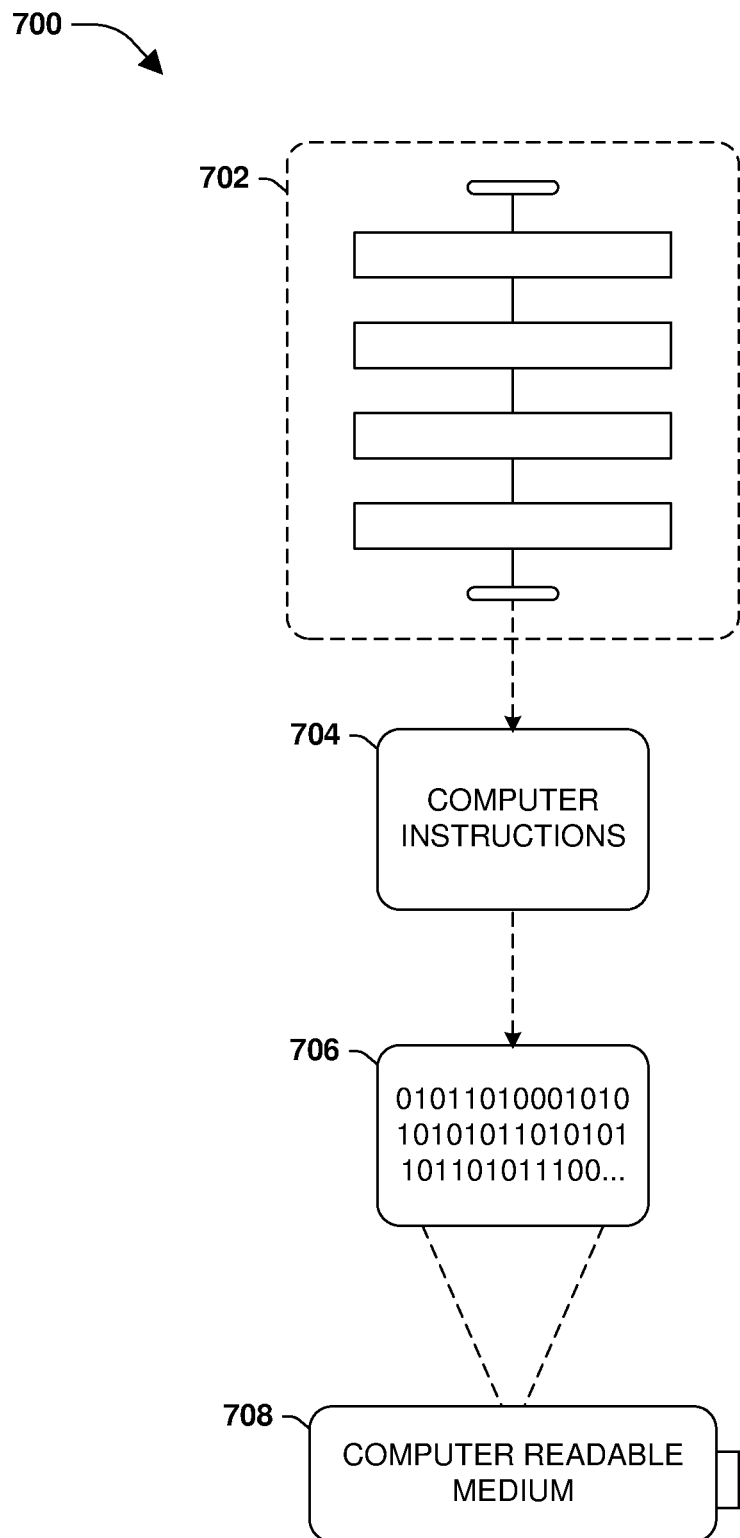
FIG. 7 is an example of a computer readable medium in which an embodiment of the invention may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702, such as at least some of the exemplary method 400 of FIG. 4, for example. In some embodiments, the processor-executable computer instructions 704 are configured to implement a system, such as at least some of the exemplary system 500 of FIGS. 5A-5E and/or at least some of the exemplary system 600 of FIG. 6, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   hosting a persistent memory storage tier and a storage file system tier within a storage operating system storage stack of a node, and
      wherein the persistent memory storage tier is configured to manage a persistent memory file system that stores data within persistent memory according to byte-addressable access,
      wherein the persistent memory storage tier supports a first atomicity size for operations retargeted to the persistent memory, wherein the first atomicity size is larger than a second atomicity size natively supported by the persistent memory; and
      wherein the storage file system tier is configured to manage a storage file system that stores data within a storage device according to block-addressable access; and
   generating a snapshot to comprise at least some data within the persistent memory and at least some data within the storage device.

2. The method of claim 1, comprising:
   mirroring data within the persistent memory of the node to a partner persistent memory of a partner node that is a partner of the node, wherein subsequent operations are rerouted from the node to the partner node for access to the partner persistent memory.

3. The method of claim 1, comprising:
   managing, by the persistent memory storage tier the persistent memory at a higher level within the storage operating system storage stack than a level at which the storage file system is managed by the storage file system tier such that operations targeting the storage file system are intercepted by the persistent memory storage tier before reaching the storage file system tier.

4. The method of claim 1, comprising:
   evaluating an operation utilizing a policy to determine whether the operation is to be executed through the storage file system or the persistent memory file system, wherein the policy specifies that operations targeting files that are randomly written to are to be retargeted to the persistent memory; and
   retargeting the operation for execution through the persistent memory file system based upon the operation targeting a file that was randomly accessed.

5. The method of claim 1, comprising:
   evaluating an operation utilizing a policy to determine whether the operation is to be executed through the storage file system or the persistent memory file system, wherein the policy specifies that operations targeting data that is access within a threshold timespan or accessed above a threshold frequency are to be retargeted to the persistent memory; and
   retargeting the operation for execution through the persistent memory file system based upon the operation targeting data accessed within the threshold timespan or accessed above the threshold frequency.

6. The method of claim 1, comprising:
   maintaining a data structure within the persistent memory storage tier to track data that is resident within the persistent memory; and
   in response to an operation targeting data not tracked within the data structure, invoking the storage file system to execute the operation upon the storage device according to the block-addressable access.

7. The method of claim 1, comprising:
   restoring data captured within the snapshot to the persistent memory and to the storage device.

8. The method of claim 1, comprising:
   implementing volume level data replication of data stored across the persistent memory and a storage tier different than the persistent memory.

9. The method of claim 1, comprising:
   determining whether to transmit a read operation, targeting the storage file system, to the storage file system or the persistent memory based upon a determination of whether data to be read by the read operation is stored within the persistent memory.

10. The method of claim 1, comprising:
determining whether to transmit a write operation, targeting the storage file system, to the storage file system or the persistent memory based upon a policy.

11. A computing device comprising:
a memory comprising machine executable code for performing a method; and
a processor coupled to the memory, the processor configured to execute the machine executable code to cause the processor to:
   maintain a persistent memory storage tier and a storage file system tier within a storage operating system storage stack of a node,
      wherein the persistent memory storage tier is configured to manage a persistent memory file system that stores data within persistent memory according to byte-addressable access,
      wherein the persistent memory storage tier supports a first atomicity size for operations retargeted to the persistent memory, wherein the first atomicity size is larger than a second atomicity size natively supported by the persistent memory; and
      wherein the storage file system tier is configured to manage a storage file system that stores data within a storage device according to block-addressable access; and
   mirror data within the persistent memory of the node to a partner persistent memory of a partner node that is a partner of the node, wherein subsequent operations are rerouted from the node to the partner node for access to the partner persistent memory.

12. The computing device of claim 11, wherein the machine executable code causes the processor to:
generate a snapshot to comprise at least some data within the persistent memory and at least some data within the storage device.

13. The computing device of claim 12, wherein the machine executable code causes the processor to:
restore data captured within the snapshot to the persistent memory and to the storage device.

14. The computing device of claim 11, wherein the machine executable code causes the processor to:
manage, by the persistent memory storage tier the persistent memory at a higher level within the storage operating system storage stack than a level at which the storage file system is managed by the storage file system tier such that operations targeting the storage file system are intercepted by the persistent memory storage tier before reaching the storage file system tier.

15. The computing device of claim 11, wherein the machine executable code causes the processor to:
evaluate the operation utilizing a policy to determine whether the operation is to be executed through the storage file system or the persistent memory file system, wherein the policy specifies that operations targeting files that are randomly written to are to be retargeted to the persistent memory; and
retarget the operation for execution through the persistent memory file system based upon the operation targeting a file that was randomly accessed.

16. The computing device of claim 11, wherein the machine executable code causes the processor to:
evaluate the operation utilizing a policy to determine whether the operation is to be executed through the storage file system or the persistent memory file system, wherein the policy specifies that operations targeting data that is access within a threshold timespan or accessed above a threshold frequency are to be retargeted to the persistent memory; and
retarget the operation for execution through the persistent memory file system based upon the operation targeting data accessed within the threshold timespan or accessed above the threshold frequency.

17. The computing device of claim 11, wherein the machine executable code causes the processor to:
maintain a data structure within the persistent memory storage tier to track data that is resident within the persistent memory; and
in response to the operation targeting data not tracked within the data structure, invoke the storage file system to execute the operation upon the storage device according to the block-addressable access.

18. The computing device of claim 11, wherein the machine executable code causes the processor to:
implement volume level data replication of data stored across the persistent memory and a storage tier different than the persistent memory.

19. The computing device of claim 11, wherein the machine executable code causes the processor to:
determine whether to transmit a read operation, targeting the storage file system, to the storage file system or the persistent memory based upon a determination of whether data to be read by the read operation is stored within the persistent memory.

20. A non-transitory machine readable medium comprising instructions for performing a method, which when executed by a machine, causes the machine
hosting a persistent memory storage tier and a storage file system tier within a storage operating system storage stack of a node, and
   wherein the persistent memory storage tier is configured to manage a persistent memory file system that stores data within persistent memory according to byte-addressable access, and
   wherein the storage file system tier is configured to manage a storage file system that stores data within a storage device according to block-addressable access; and
supporting, by the persistent memory storage tier, a first atomicity size for operations retargeted to the persistent memory, wherein the first atomicity size is larger than a second atomicity size natively supported by the persistent memory.

* * * * *